(12) United States Patent
Bajaj et al.

(10) Patent No.: US 12,406,282 B2
(45) Date of Patent: Sep. 2, 2025

(54) SYSTEMS AND METHODS FOR ALTERING A GRAPHICAL USER INTERFACE (GUI) BASED ON AFFINITY AND REPURCHASE INTENT

(71) Applicant: Walmart Apollo, LLC, Bentonville, AR (US)

(72) Inventors: Ahsaas Bajaj, Sunnyvale, CA (US); Aleksandra Cerekovic, Sunnyvale, CA (US); Evren Korpeoglu, San Jose, CA (US); Kannan Achan, Saratoga, CA (US); Sinduja Subramaniam, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 278 days.

(21) Appl. No.: 18/102,239

(22) Filed: Jan. 27, 2023

(65) Prior Publication Data

US 2023/0244741 A1 Aug. 3, 2023

Related U.S. Application Data

(60) Provisional application No. 63/304,051, filed on Jan. 28, 2022.

(51) Int. Cl.
*G06Q 30/0251* (2023.01)
*G06F 16/957* (2019.01)
*G06Q 30/0201* (2023.01)

(52) U.S. Cl.
CPC ..... *G06Q 30/0255* (2013.01); *G06F 16/9577* (2019.01); *G06Q 30/0201* (2013.01)

(58) Field of Classification Search
None
See application file for complete search history.

(56) References Cited

U.S. PATENT DOCUMENTS

| 8,032,405 B2* | 10/2011 | Gilbert | G06Q 10/06375 |
| | | | 705/7.31 |
| 8,190,601 B2* | 5/2012 | Ahari | G06F 16/951 |
| | | | 707/723 |
| 10,274,983 B2* | 4/2019 | Hardjasa | G05F 1/66 |

(Continued)

OTHER PUBLICATIONS

Klyuieva, I., "Improving Quality of the Multiclass SVM Classification Based on the Feature Engineering," [Abstract only], 2019 1st International Conference on Control Systems, Mathematical Modelling, Automation and Energy Efficiency (SUMMA): 91-4. IEEE. (Year: 2019).*

*Primary Examiner* — Nicholas D Rosen
(74) *Attorney, Agent, or Firm* — Foley & Lardner LLP

(57) ABSTRACT

Systems and methods including one or more processors and one or more non-transitory storage devices storing computing instructions configured to run on the one or more processors and perform: receiving in-session user activity entered into on an initial graphical user interface (GUI) from a user electronic device of a user; pre-processing the in-session user activity to determine one or more intents of the in-session user activity; comparing the one or more intents of the in-session user activity with one or more complementary intents; and coordinating displaying a complimentary GUI on the user device of the user based on the one or more complementary intents. Other embodiments are disclosed herein.

20 Claims, 6 Drawing Sheets

(56) References Cited

U.S. PATENT DOCUMENTS

| | | | |
|---|---|---|---|
| 10,275,820 B2* | 4/2019 | Guo | G06N 3/045 |
| 10,796,321 B1* | 10/2020 | Balakrishnan | G06Q 30/0631 |
| 11,017,045 B2* | 5/2021 | Kleiner | G06F 3/0482 |
| 11,205,218 B2* | 12/2021 | Ouyang | G06Q 30/0641 |
| 11,238,371 B2* | 2/2022 | Kloepper | G06N 20/00 |
| 11,537,495 B2* | 12/2022 | You | G06N 3/08 |
| 11,562,395 B2* | 1/2023 | Lu | G06Q 30/0275 |
| 11,836,066 B2* | 12/2023 | You | G06N 3/045 |
| 11,948,162 B2* | 4/2024 | Colombier | G06Q 30/0643 |
| 12,026,591 B2* | 7/2024 | Monaghan | G06N 20/20 |
| 12,026,728 B2* | 7/2024 | Achan | G06F 18/2321 |
| 2008/0162268 A1* | 7/2008 | Gilbert | G06Q 10/06375 705/7.29 |
| 2010/0114654 A1* | 5/2010 | Lukose | G06Q 30/00 705/14.54 |
| 2010/0299343 A1* | 11/2010 | Ahari | G06F 16/951 707/754 |
| 2011/0035253 A1* | 2/2011 | Mason | G06Q 10/06311 705/7.13 |
| 2011/0092763 A1* | 4/2011 | Rabinowitz | C12Q 1/6883 702/19 |
| 2013/0151311 A1* | 6/2013 | Smallwood | G06Q 50/01 705/7.31 |
| 2017/0115682 A1* | 4/2017 | Hardjasa | G05F 1/66 |
| 2017/0193592 A1* | 7/2017 | Avidan | G06Q 10/087 |
| 2018/0218429 A1* | 8/2018 | Guo | G06N 3/045 |
| 2019/0294998 A1* | 9/2019 | Kloepper | G06N 20/00 |
| 2019/0385219 A1* | 12/2019 | Ouyang | G06Q 30/0641 |
| 2020/0159862 A1* | 5/2020 | Kleiner | G06F 16/248 |
| 2021/0027194 A1* | 1/2021 | Monaghan | G06N 5/02 |
| 2021/0359410 A1* | 11/2021 | Li | H01Q 1/246 |
| 2022/0245669 A1* | 8/2022 | Lu | G06N 5/01 |
| 2023/0214854 A1* | 7/2023 | Colombier | G06Q 30/0641 705/7.29 |
| 2024/0428277 A1* | 12/2024 | Achan | G06F 18/2321 |

* cited by examiner

SYSTEMS AND METHODS FOR ALTERING A GRAPHICAL USER INTERFACE (GUI) BASED ON AFFINITY AND REPURCHASE INTENT

CROSS-REFERENCE TO RELATED APPLICATIONS

This application claims priority to U.S. Provisional Patent Application No. 63/304,051, filed Jan. 28, 2022. U.S. Provisional Patent Application No. 63/304,051 is incorporated herein by reference in its entirety.

TECHNICAL FIELD

This disclosure relates generally to graphical user interface technologies, and more particular to the creation of graphical user interfaces optimized based on a predicted product type intent of the user.

BACKGROUND

Graphical user interfaces ("GUIs") are integral to the operation of modern-day computer systems. Before their creation, text based user interfaces ("TUIs") (e.g., MS-DOS, Unix, etc.) excluded a large population of non-technical users from operating computer terminals due to the complexity of operating TUIs. Non-technical users would memorize or consult a chart of clunky, text-based commands and laboriously enter these commands into the TUI in order to operate a computer terminal. This changed with the advent of early GUIs, which allowed a non-technical user to operate a computer terminal using a mouse and without text based commands.

Early GUIs, though, posed their own problems. Many times, commands a user wanted to execute were buried in the GUI within a sub-menu accessible only after repeated inputs into the GUI (e.g., a drop down menu, a different tab, a different screen of the GUI, etc.). This, then, lead to user frustration and the inability of the user to use these desired commands. One solution to this problem is to make every command accessible on a GUI without sub-menus, but this poses its own problems. For example, many modern computer systems simply have too many commands to display them all without sub-menus. Further, the advent of computing on mobile devices, many of which have small displays, has made this solution impractical or impossible.

More recently, predictive algorithms have been used to customize commands displayed on GUIs based on historical user activity. For example, many GUIs will consider historical usage patterns and display GUI elements for frequently used commands. This blunderbuss approach to GUI customization, though, can cause frequently used commands to overpopulate the GUI and push out other relevant commands. Further, past approaches do not consider an intent of a user to utilize a specific command during specific usage session.

Therefore, in view of the above, there is a need for an improved GUI that predicts and displays relevant GUI elements.

BRIEF DESCRIPTION OF THE DRAWINGS

To facilitate further description of the embodiments, the following drawings are provided in which.

Figure 1:
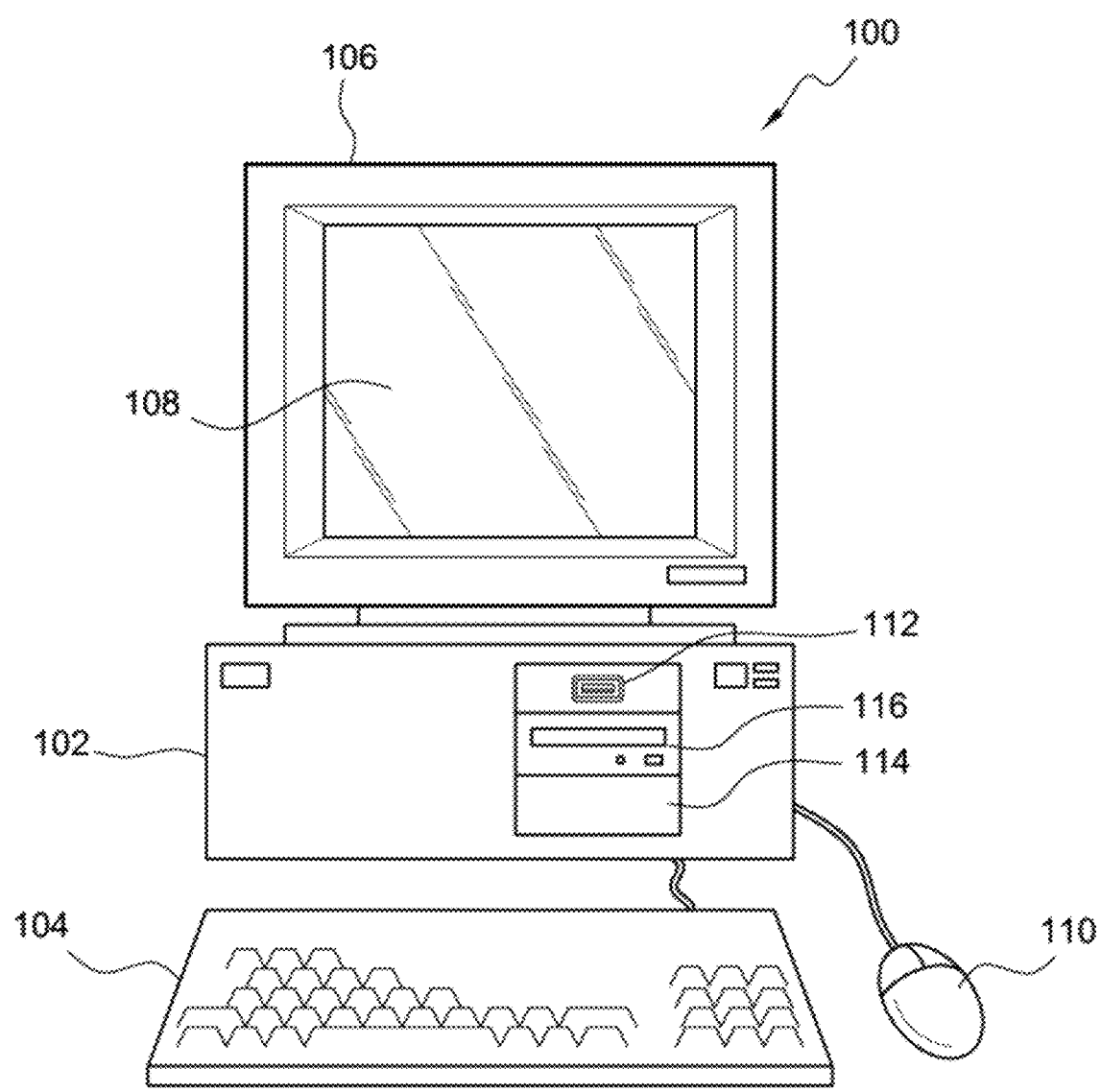
FIG. 1 illustrates a front elevational view of a computer system that is suitable for implementing various embodiments of the systems disclosed in FIGS. 3 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving, from an electronic device of a user, in-session user activity on a graphical user interface (GUI) of a website displayed to the user via the electronic device; selectively aggregating the in-session user activity by sorting the in-session user activity into one or more groups; predicting one or more product type intents of the user based on the one or more groups; post-processing the one or more product type intents to filter out one or more non-relevant product type intents from the one or more product type intents to create filtered product type intents; and modifying the GUI to display the filtered product type intents to the user.

Various embodiments include a method. The method can be implemented via execution of computing instructions configured to run at one or more processors and configured to be stored at non-transitory computer-readable media. The method can comprise receiving, from an electronic device of a user, in-session user activity on a graphical user interface (GUI) of a website displayed to the user via the electronic device; selectively aggregating the in-session user activity by sorting the in-session user activity into one or more groups; predicting one or more product type intents of the user based on the one or more groups; post-processing the one or more product type intents to filter out one or more non-relevant product type intents from the one or more product type intents to create filtered product type intents; and modifying the GUI to display the filtered product type intents to the user.

Figure 2:
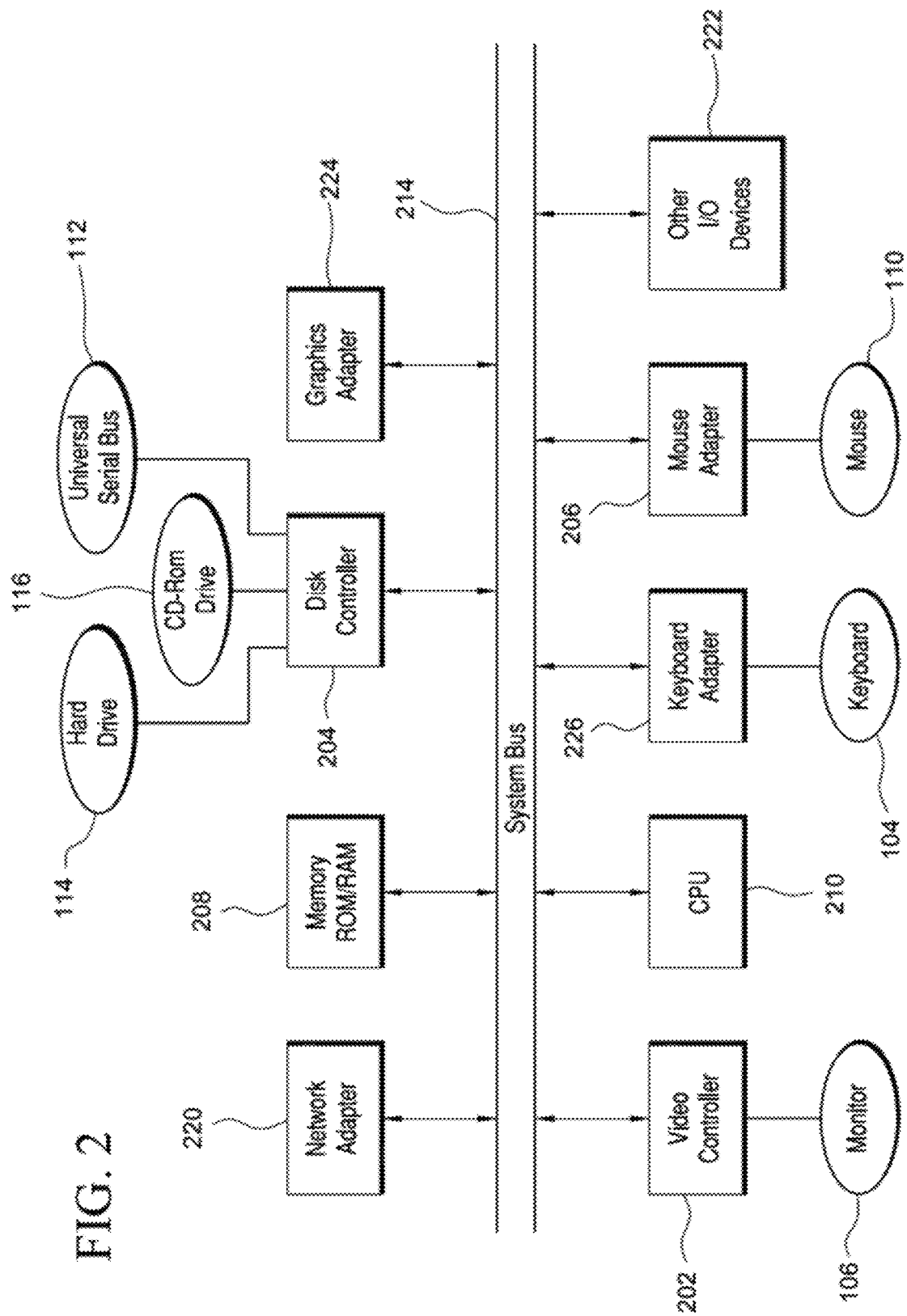
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module (s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac®

OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
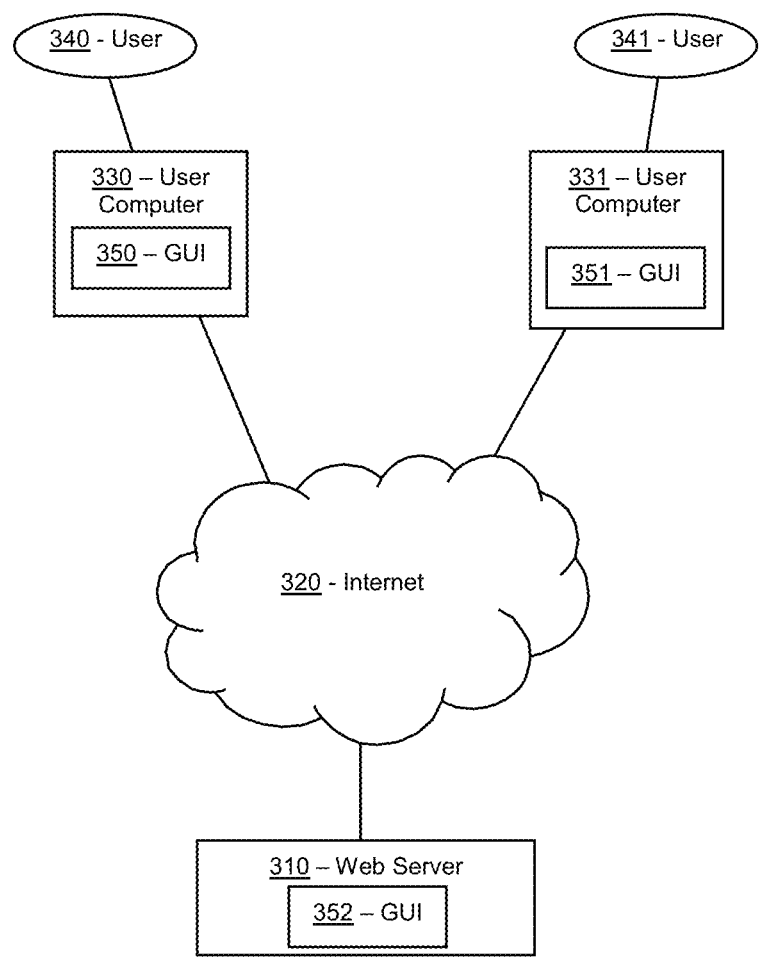
FIG. 3 illustrates a representative block diagram of a system, according to an embodiment.

Turning ahead in the drawings, FIG. 3 illustrates a block diagram of a system 300 that can be employed for altering a GUI, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310. Additional details regarding web server 310 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise GUI 350, 351, 352. In the same or different embodiments, GUI 350, 351, 352 can be part of and/or displayed by user computers 330, 331, which also can be part of system 300. In some embodiments, GUI 350, 351, 352 can comprise text and/or graphics (images) based user interfaces. In the same or different embodiments, GUI 350, 351, 352 can comprise a heads up display ("HUD"). When GUI 350, 351, 352 comprises a HUD, GUI 350, 351, 352 can be projected onto a medium (e.g., glass, plastic, etc.), displayed in midair as a hologram, or displayed on a display (e.g., monitor 106 (FIG. 1)). In various embodiments, GUI 350, 351, 352 can be color, black and white, and/or greyscale. In many embodiments, GUI 350, 351, 352 can comprise an application running on a computer system, such as computer system 100 (FIG. 1), user computers 330, 331, and/or web server 310. In the same or different embodiments, GUI 350, 351, 352 can comprise a website accessed through internet 320. In some embodiments, GUI 350, 351, 352 can comprise an eCommerce website. In these or other embodiments, GUI 352 can comprise an administrative (e.g., back end) GUI allowing an administrator to modify and/or change one or more settings in system 300. In the same or different embodiments, GUI 350, 351, 352 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc. In many embodiments, GUI 350, 351, 352 can comprise one or more GUI elements. In these or other embodiments, a GUI element can comprise a customizable portion of a GUI (e.g., a button, a text entry box, a hyperlink, an image, a text block, etc.). In various embodiments, a GUI element can be selectable by a user 340, 341 and/or interactive.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310 and user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or user computers 330, 331. In a similar manner, the processing module(s) and the memory storage module(s) can be local and/or remote to each other.

In many embodiments, web server 310 and/or user computers 330, 331 can be configured to communicate with one another. In various embodiments, web server 310 and/or user computers 330, 331 can communicate or interface (e.g., interact) with each other through a network or internet 320. In these or other embodiments, internet 320 can be an intranet that is not open to the public. In further embodiments, Internet 320 can be a mesh network of individual systems. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In these or other embodiments, the operator and/or administrator of system 300 can manage system 300, the processing module (s) of system 300, and/or the memory storage module(s) of system 300 using the input device(s) and/or display device (s) of system 300.

Meanwhile, in many embodiments, web server 310 and/or user computers 330, 331 also can be configured to communicate with one or more databases. In various embodiments, one or more databases can comprise a product database that contains information about products, items, or SKUs (stock keeping units) sold by a retailer. In many embodiments, one or more databases can comprise information about interactions of user computers 330, 331 with GUIs 350, 351. For example, the one or more databases can store past (e.g., historical) interactions of user computers 330, 331 with GUIs 350, 351. In many embodiments, interactions can be tied to a unique identifier (e.g., an IP address, an advertising ID, device ID, etc.) and/or a user account. In embodiments where a user 340, 341 interacts with GUIs 350, 351 before logging into a user account, data stored in the one or more database that is associated with a unique identifier can be merged with and/or associated with data associated with the user account. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). In some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

In many embodiments, one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for an improved GUI that executes commands faster by predicting a product type intent of a user session and displaying GUI elements directed toward accomplishing that product type intent. Further, these techniques can allow non-technical users to operate a computer terminal without technical knowledge possessed by a skilled artisan.

In many embodiments, the techniques described herein can also provide for a significant improvement over conventional approaches of generating GUIs, such as displaying frequently accessed GUI elements. In many embodiments, the techniques described herein can beneficially make determinations based on dynamic information that describes current conditions and/or conditions that have occurred during a single user session. In this way, the techniques described herein can avoid problems with stale and/or outdated data by continually updating during the single user session.

In a number of embodiments, the techniques described herein can solve a technical problem that arises only within the realm of computer networks, as GUIs do not exist outside the realm of computer networks.

Figure 4:
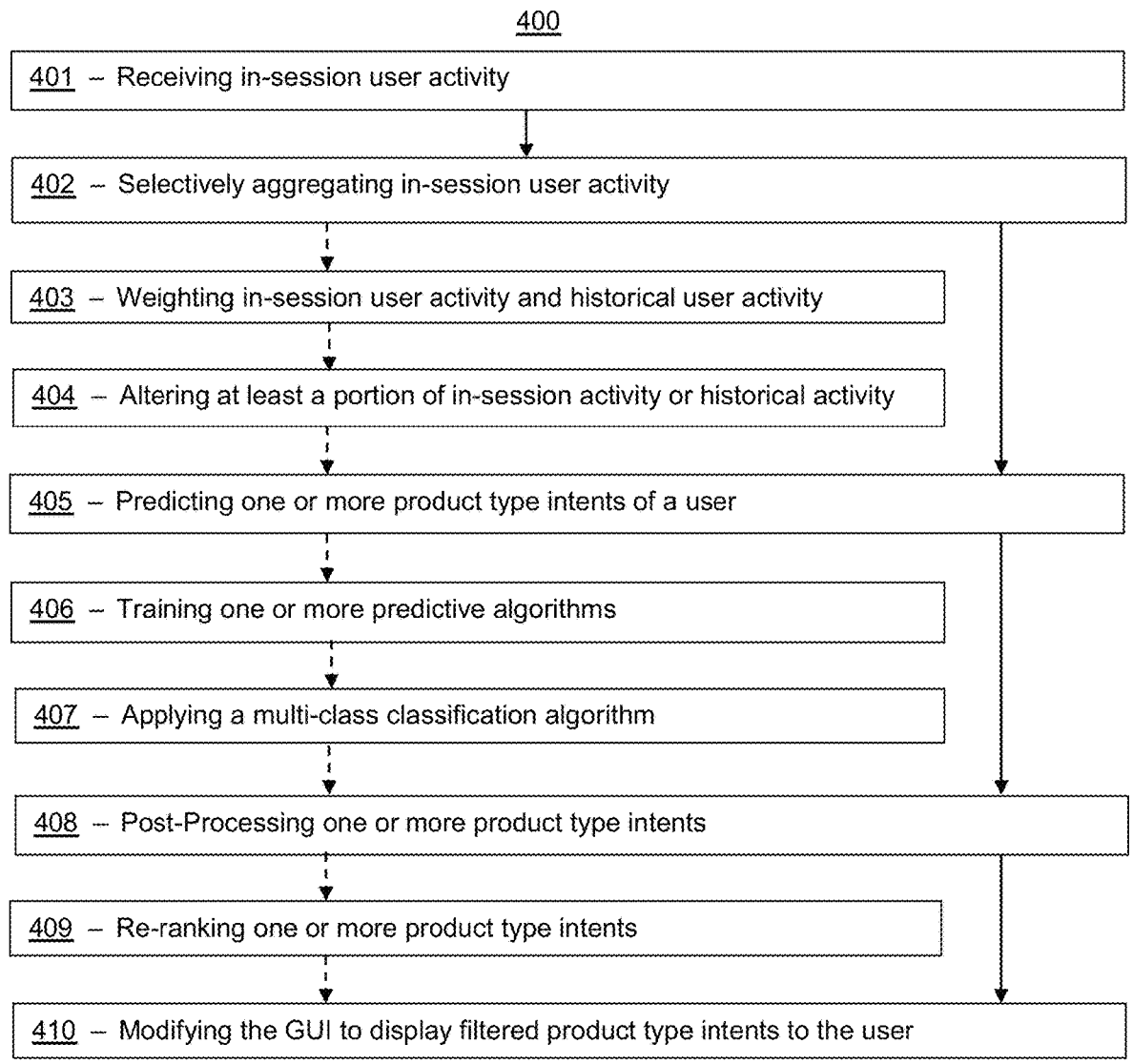
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or user computers 330, 331 (FIG. 3). The processing module(s) can be similar or identical to the processing module(s) described above with respect to computer system 100 (FIG. 1).

In many embodiments, method 400 can comprise an activity 401 of receiving in-session user activity. In various embodiments, in-session user activity can comprise interactions with a GUI that occur during a user session. For example, in-session user activity can comprise interactions with a web site during a browsing session on the website. As another example, in-session user activity can comprise interactions with a computer program that occur beginning from when the program is opened to when the program is closed. It will be understood that while many user sessions end when a GUI is closed (e.g., by navigating away from a website or closing a program), user sessions can persist after closure of the GUI. For example, it can be considered one user session when a user opens a GUI, closes the GUI, and then a short time later re-opens the GUI. What is considered a user session can be determined by an administrator of system 300 (FIG. 3) based on the specifications and/or constraints of the system and its administrator. In many embodiments, in-session user activity can be continually streamed to a database and/or a cache for storage and further processing. This cached in-session user activity can then be quickly accessed on demand to create a GUI customized to the specific user session. In various embodiments, user activity can be entered into an initial GUI. As described herein, an "initial GUI" need not be restricted to a GUI displayed when a user initially opens the GUI. "Initial GUI" is merely used to differentiate the initial GUI from subsequent GUIs (e.g., an altered GUI described in activity 410 below). For example, an initial GUI can be displayed in the middle and/or at the end of a user session. As another example, an altered GUI (as described in activity 410 below) can become an initial GUI when it is further altered according to the techniques described herein.

In many embodiments, method 400 can comprise an activity 402 of selectively aggregating in-session user activity. Activity 402 can occur after activity 401. In some embodiments, in-session user activity can be selectively aggregated with historical user activity. In various embodiments, historical user activity can comprise in-person user activity and/or the interactions with GUIs described above. For example, when an operator of a website also owns a building (e.g., a brick and mortar store), actions of a user can be tracked while the user is in the building. These in-building actions can then be categorized, stored in a database as historical activities, and then retrieved by one or more components of system 300 (FIG. 3) for use in the techniques described herein. In various embodiments, selectively aggregating in-session and/or historical activity can comprise sorting the in-session activity and/or the historical activity into groups. In these embodiments, the in-session and/or the historical activity can be grouped by, recency of interactions (e.g., interactions made during a previous month, previous week, previous day, previous hour, etc.), a categorization level in a hierarchical categorization scheme of an item that is the subject of an interaction (e.g., an item type, a sub-department, a department, a super-department, etc.) type of interaction (a click, a look, a selection, a grab, an add to cart, a view, a purchase, a bid, a swipe, a pinch, a reverse pinch, etc.), and/or a distribution of interaction counts in a categorization level of a hierarchical categorization scheme (e.g. interaction counts made a week ago in an item type of "baby blankets" by an individual user can be grouped with respect to an overall distribution of interactions made a week ago by multiple users in the item type of "baby blankets"). These groups can then be further processed and/or fed to downstream predictive algorithms as an input, and an altered GUI can be generated that is directed to a user product type intent within that specific group of interactions. In many embodiments, selectively aggregating in-session activity and/or historical activity can comprise altering at least one of the in-session activity or the historical activity. In some embodiments, selectively aggregating the in-session user activity by sorting the in-session user into the one or more groups can include altering at least a portion of the in-session activity or the historical user activity based on at least one of: i) features corresponding to purchase patterns of the user, ii) price based features, iii) a number of items in a product type, iv) a number of item groups in a product type, v) a number of unique purchases and repeated purchases in a product type or vi) the in-session user activity, as weighted, and the historical user activity, as weighted.

In some embodiments, method 400 can optionally comprise activity 403 of weighting in-session user activity and historical user activity. Activity 403 can be performed after activity 402. In various embodiments, activity 403 can be performed at the same time or as a part of activity 402 and/or activity 404. In some embodiments, activity 403 can be performed after activity 404. In various embodiments, portions of in-session activity or historical activity can be altered from consideration by downstream predictive algorithms according to one or more predictive algorithms. In these or other embodiments, portions of in-session activity or historical activity can be weighted such that their influence on downstream predictive algorithms is increased or decreased depending on the weighting. In many embodiments, weights can be used when training downstream predictive models. In these or other embodiments, weights can be used to increase a probability of altering a GUI in a specific way or in order to target a specific user product type intent.

For example, in-session activity or historical activity can be weighted according to a price of an item interacted with. In this way, cheaper items (e.g., consumables that are frequently purchased) do not have a skewing effect on downstream predictive algorithms. In some embodiments, in-session activity or historical activity can be weighted based on at least one of: i) features corresponding to purchase patterns of the user, ii) price based features, iii) a number of items in a product type, iv) a number of item groups in a product type, v) a number of unique purchases and repeated purchases in a product type or vi) the in-session user activity, as weighted, and the historical user activity, as weighted.

In some embodiments, method 400 can optionally comprise activity 404 of altering at least a portion of in-session activity and historical user activity. Activity 404 can be performed after activity 403. In various embodiments, activity 404 can be performed at the same time or as a part of activity 402 and/or activity 403. In some embodiments, activity 404 can be performed before activity 403. In many embodiments, in-session activity and historical activity can be altered from consideration by downstream predictive algorithms. In this way, a more accurate prediction can be made by minimizing and/or removing noise from the prediction. Altering portions of in-session activity or historical activity from consideration can be accomplished in a number of ways. For example, portions of the in-session activity or the historical activity can be removed when a user accesses a GUI via a specific access portal (e.g., an application, a website, a mobile device, a desktop computer, a wearable user device, a specific type of operating system, etc.). In this way, repetitive commands that are performed via a specific access portal can be removed from consideration by downstream predictive algorithms. In a more specific example, portions of in-session activity or historical activity can be removed from consideration when a user accesses a specific portion of an access portal (e.g., activity data for a furniture access portal can be removed from consideration when a user accesses a grocery access portal). In this way, irrelevant commands that are performed via a specific access portal can be removed from consideration by downstream predictive algorithms operating on a different access portal. In some embodiments, portions of in-session activity or historical activity can be altered from consideration based on at least one of: i) features corresponding to purchase patterns of the user, ii) price based features, iii) a number of items in a product type, iv) a number of item groups in a product type, v) a number of unique purchases and repeated purchases in a product type or vi) the in-session user activity, as weighted, and the historical user activity, as weighted.

In many embodiments, specific actions in in-session activity or historical activity can be removed because it is unlikely that the action will be performed twice in a predetermined amount of time. For example, a GUI for a smart home can remove a "lock front door" command from in-session activity. As another example, a purchase of a television can be removed from historical activity. In these or other embodiments, a complementary action can be added to in-session activity or historical activity in response to specific actions. To continue with the example above, a "lock back door" command and a purchase TV stand command (e.g., an advertisement for a television) can be added for consideration by a downstream predictive algorithm.

In many embodiments, method 400 can comprise an activity 405 of predicting one or more product type intents of a user. Activity 405 can occur after activity 401 and also after one or more of activities 402, 403, or 404. In some embodiments, the product type intent of a user can be predicted using a first set of predictive algorithms. In these or other embodiments, an input for a predictive algorithm can comprise in-session activity and/or historical activity. In various embodiments, the in-session activity and/or the historical activity can be aggregated (e.g., selectively aggregated) as described above before being inputted into a predictive algorithm. In some embodiments, a first set of predictive algorithms can comprise one or more machine learning algorithms. In these or other embodiments, in-session activity and/or historical activity can be converted into vector format before being inputted into a predictive algorithm. In many embodiments, a vector can be constructed by incrementing a count in an activity database that tracks a specific action. For example, an activity database can include activity types such as views, purchases, add-to-carts, etc. and corresponding counts for in-session activity and historical activity. It will be understood that these narrative descriptions can be replaced by various identifiers (e.g., a key value) that can be understood by a computer system (e.g., system 100 (FIG. 1)). In some embodiments, predicting the one or more product type intents of the user can include incrementing a count in the activity database for a product type intent for the user when no purchase information is present (i.e. a new purchase in the product type) and decreasing the count in the activity database when the product type intent for the user has recent purchase information present (i.e. a repurchase in the product type). For example, for a product type intent for "banana," if a recent purchase for "banana" is present the count for the "banana" product type will be decreased to mitigate giving increased weight to the "banana" product type.

In some embodiments, method 400 can optionally comprise activity 406 of training one or more predictive algorithms. Activity 406 can occur after activity 405. In various embodiments, activity 406 can be performed at the same time or as a part of activity 405 and/or activity 407. In some embodiments, training a predictive algorithm can comprise estimating internal parameters of a model configured to determine a product type intent of a user while interacting with a GUI. In various embodiments, a predictive algorithm can be trained using labeled training data, otherwise known as a training dataset. In many embodiments, a training dataset can comprise all or a part of in-session activity and/or historical activity. In the same or different embodiments, a predictive algorithm can comprise a multi-class classifier, a logistic regressor, a tree-based model (e.g., XGBoost), a learning to rank framework (e.g., LambdaRank), and/or other suitable predictive models. In the same or different embodiments, a pre-trained predictive algorithm can be used, and the pre-trained algorithm can be re-trained on the labeled training data. In many embodiments, a predictive algorithm can be iteratively trained in real time as data is added to a training data set (e.g., as a user interacts with a GUI in a user session). In various embodiments, a predictive algorithm can be trained, at least in part, on a single user's (e.g., user 340 (FIG. 3)) interaction data or the single user's interaction data can be weighted in a larger training data set. In this way, a predictive algorithm tailored to a single user can be generated. In the same or different embodiments, a predictive algorithm tailored to a single user can be used as a pre-trained algorithm for a similar user. In many embodiments, a predictive algorithm can be trained, at least in part, on interaction data for a single category of GUI element or the single category of GUI element's interaction data can be weighted in a larger training data set. For example, in-session activity and/or historical activity for an item type that is frequently purchased (e.g. bananas) can be weighted down based on one or more of price or access portal. In this way, a skewing effect on downstream predictive algorithms can be avoided for items that are frequently purchased. In this way, a predictive algorithm tailored to a type of user (e.g. a user who is buying non-grocery items) can be generated. In several embodiments, due to a large amount of data used to create and maintain a training data set, a predictive algorithm can use extensive data inputs to determine a product type intent. Due to these extensive data inputs, in many embodiments, creating, training, and/or using a predictive algorithm configured to determine a product type intent cannot practically be performed in a mind of a human being.

In some embodiments, method 400 can optionally comprise activity 407 of applying a multi-class classification algorithm. Activity 407 can occur after activity 406. In various embodiments, activity 407 can be performed at the same time or as a part of 405 and/or 406. In these or other embodiments, a multi-class classification model can comprise an algorithmic and/or mathematical model configured to predict probabilities of multiple outcomes. For example, a multi-class classification model can predict one or more probabilities that a user displays one or more intents to perform one or more different actions on a GUI. In many embodiments, a multi-class classification model can model one or more categorically distributed dependent variables (e.g., one or more intents) based on one or given a set of independent variables (e.g., in-session activity and/or historical activity). In some embodiments, a multi-class classification algorithm can comprise one or more logistic regressors configured to determine an identity of one or more categorically distributed dependent variables given a set of independent variables. In many embodiments, a logistic regressor can use an equation comprising:

$$P_{Purch\_Pti} = \begin{cases} 0, & \text{if } X \text{ is null vector} \\ \dfrac{1}{(1 - e^{-W*X^T})}, & \text{otherwise} \end{cases}$$

In these or other embodiments, $P_{Purch\_Pti}$ can comprise a likelihood of a user performing an action on a GUI (e.g., a probability of a user having an intent), X can comprise one or more user features (e.g., one or more vectors constructed from interactions with a GUI taken from in-session activity and/or historical activity), and W can comprise one or more learnt weights of a model PTi for a complementary action space. For example a model PTi trained to predict a user's intent to purchase a television stand in a session can have features containing a user's in-session activity and/or historical activity with television items and/or furniture items.

In many embodiments, one or more user features can be pre-processed as described above with regards to activities 401-404. In various embodiments, one or more user features can be limited to actions that precede complementary actions predicted by $P_{Purch\_Pti}$. In these or other embodiments, $P_{Purch\_Pti}$ can comprise a ranked list of likely actions, and portion of a GUI can be modified in view of each of these likely actions. In many embodiments, $P_{Purch\_Pti}$ can be set to 0 when X is a null vector. For example, continuing with the example above, a model PTi trained to predict an intent to purchase a television can have a null feature vector X for a user who only buys grocery items and does not interact with non-consumable products.

In many embodiments, method 400 can comprise an activity 408 of post-processing one or more product type intents. Activity 408 can occur after activity 401, after one or more of activities 402, 403, or 404, and also after one or more of activities 405, 406, or 407. In these or other embodiments, post-processing one or more product type intents can comprise filtering out one or more non-relevant intents from the one or more product type intents to create filtered product type intents. In these or other embodiments, product type intents to perform an action can be removed from a ranked list of likely intents because they are unlikely to be performed twice in a predetermined amount of time (e.g., product type intents directed toward non-consumable products). For example, a product type intent to purchase a television can be removed from a user's future product type intents when the user has recently purchased a television. In these or other embodiments, a product type intent can be removed from a ranked list when it was performed within a predetermined amount of time.

In some embodiments, method 400 can optionally comprise activity 409 of re-ranking one or more product type intents. Activity 409 can occur after activity 408. In many embodiments, activity 409 can be performed at the same time as or as a part of activity 408. In various embodiments, activity 409 can be performed independently and/or in place of activity 408. In various embodiments, one or more product type intents can be re-ranked using a dot product of the one or more product type intents (e.g., using vectors representing the one or more product type intents).

In many embodiments, method 400 can comprise an activity 410 of modifying the GUI to display filtered product type intents to the user. Activity 410 can occur after activity 401, after one or more of activities 402, 403, or 404, after one or more of activities 405, 406, or 407, and also after one or more of activities 408 or 409. In some embodiments, modifying the GUI creates an altered GUI. As described herein, an "altered GUI" need not be restricted to a GUI displayed near an end of a user session. "Altered GUI" is merely used to differentiate the altered GUI from previous GUIs (e.g., an initial GUI described in activity 401 above). Further, an altered GUI need not be displayed immediately after an initial GUI (e.g., there can be intervening GUIs displayed between an initial GUI and an altered GUI). In various embodiments, an altered GUI can become an initial GUI and the techniques described herein can be repeated using the altered GUI as the initial GUI. In various embodiments, modifying the GUI to display an altered GUI with the filtered product type intents can comprise customizing a GUI element. In the same or different embodiments, customizing a GUI element can comprise altering an image displayed on the GUI, altering text on the GUI, altering a layout of the GUI, changing a type of the GUI, displaying an advertisement on the GUI, displaying no advertisement on the GUI, altering a color displayed on the GUI, changing a web-module configured to generate one or more portions of the GUI, etc. In many embodiments, displaying an altered GUI can comprise displaying certain content at specific times. In these or other embodiments, a GUI element can comprise advertisements for products, services, and/or events. In various embodiments, an altered GUI transmitted for display during activity 410 can be related to a predicted product type intent or action of a user, as determined above. In many embodiments, a GUI transmitted for display during activity 410 can be optimized in order to facilitate a predicted product type intent of a user or "nudge" a user towards performing a predicted action. In many embodiments, a predicted action can be an action that is likely to be performed after an action performed in a user session (e.g., a complementary action). In these or other embodiments, an altered GUI can be configured to enable a user to more efficiently perform complex predicted actions on devices where accessing the predicted action would involve laborious navigation and/or complex on screen inputs. For example, commands that would normally be buried within sub-menus or subsequent GUIs can be added to an altered GUI in a prominent area. As another example, information used to perform predicted actions can be displayed in a summary form on an altered GUI.

Figure 5A:
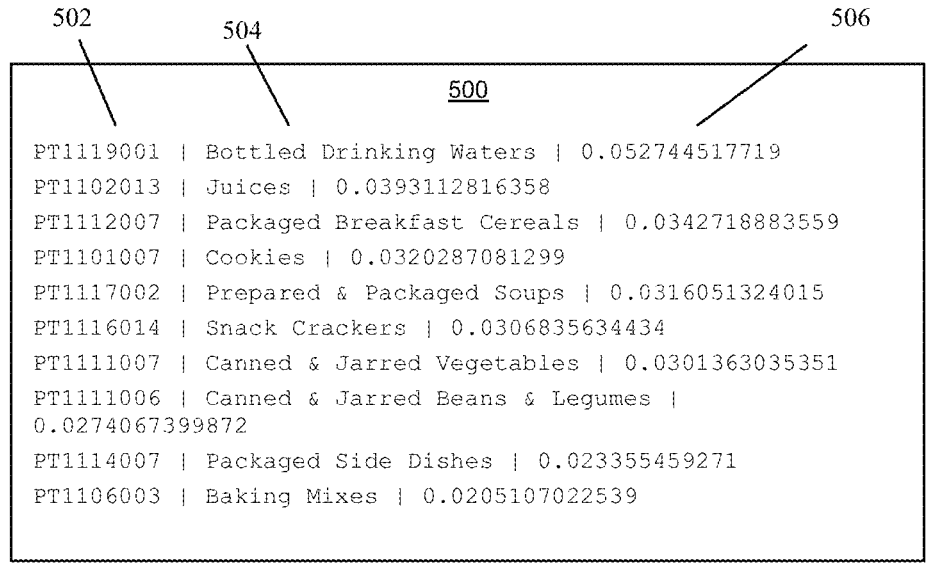
FIG. 5A illustrates an exemplary graphical user interface, according to an embodiment.
Figure 5B:
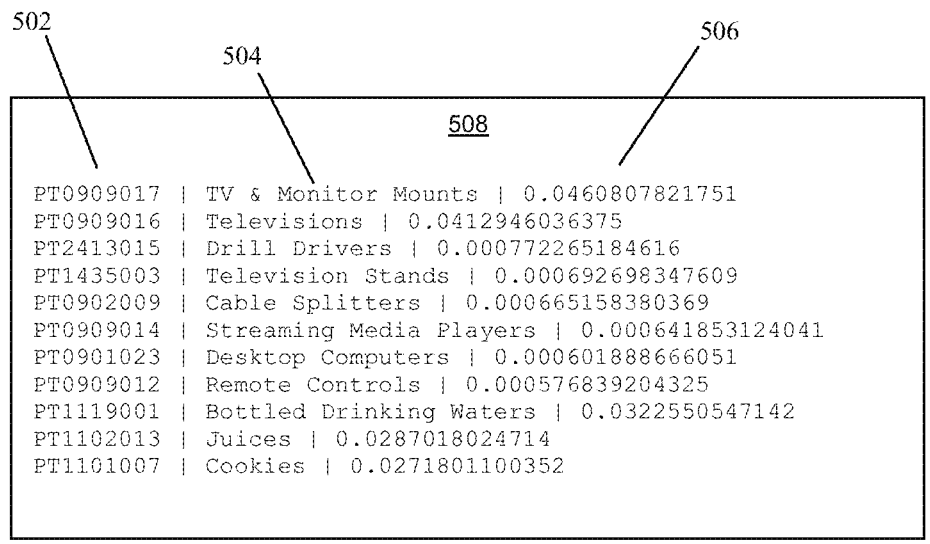
FIG. 5B illustrates an exemplary graphical user interface, according to certain embodiments.

Turning ahead in the drawings to FIGS. 5A and 5B, exemplary graphical user interfaces (GUIs) are illustrated. In the illustrated embodiment of FIG. 5A, an initial GUI 500 is illustrated including a product type code column 502, a product type name column 504, and a product type probability column 506. In the illustrated embodiment, the product type probability column 506 illustrated an affinity score output by the predictive algorithms described above. The initial GUI 500 is what would be displayed to a user prior to performing the method 400 (FIG. 4). As shown in the illustrated embodiments, the products of the initial GUI 500 correspond to perishable items that are purchased by the user on a regular basis. Accordingly, displaying the initial GUI 500 to the user would be displaying items the user has already purchased and would not be helpful to the user during subsequent user sessions.

Turning to FIG. 5B, an altered GUI 508 is illustrated. The altered GUI 508 is the outcome of performing method 400 (FIG. 4) and illustrates various products that correspond to the product type intents of the user based on the user's in-session activity and/or historical activity. In the embodiment of FIG. 5B, a more accurate prediction can be made by minimizing and/or removing noise from the prediction. Displaying the GUI 508 to the user would be displaying items the user has not purchased (frequently) in the past and would be helpful to the user during subsequent user sessions.

Figure 6:
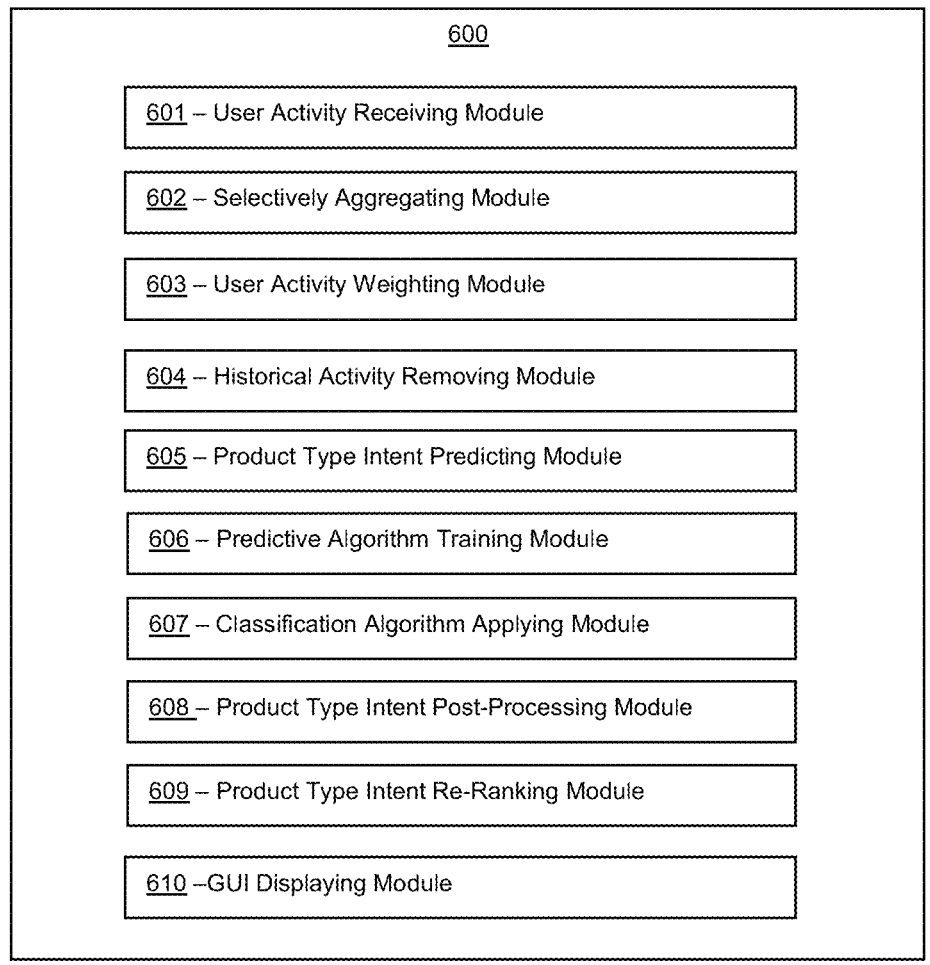
FIG. 6 illustrates a representative block diagram of a system, according to an additional embodiment.

Turning ahead in the drawings, FIG. 6 illustrates a block diagram of a system 600 that can be employed for modifying a GUI. System 600 is merely exemplary and embodiments of the system are not limited to the embodiments presented herein. System 600 can be employed in many different embodiments or examples not specifically depicted or described herein. In some embodiments, certain elements or modules of system 600 can perform various procedures, processes, and/or activities. In these or other embodiments, the procedures, processes, and/or activities can be performed by other suitable elements or modules of system 600. In many embodiments, system 600 (or a portion thereof) can be stored within web server 310 (FIG. 3) and/or user device 330 (FIG. 3).

Generally, therefore, system 600 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 600 described herein.

In many embodiments, system 600 can comprise non-transitory memory storage module 601. Memory storage module 601 can be referred to as user activity receiving module 601. In many embodiments, user activity receiving module 601 can store computing instructions configured to run on one or more processing modules and perform one or more acts of method 400 (FIG. 4) (e.g., activity 401 (FIG. 4)).

In many embodiments, system 600 can comprise non-transitory memory storage module 602. Memory storage module 602 can be referred to as selectively aggregating module 602. In many embodiments, selectively aggregating module 602 can store computing instructions configured to run on one or more processing modules and perform one or more acts of method 400 (FIG. 4) (e.g., activity 402 (FIG. 4)).

In many embodiments, system 600 can comprise non-transitory memory storage module 603. Memory storage module 603 can be referred to as user activity weighting module 603. In many embodiments, user activity weighting module 603 can store computing instructions configured to run on one or more processing modules and perform one or more acts of method 400 (FIG. 4) (e.g., activity 403 (FIG. 4)).

In many embodiments, system 600 can comprise non-transitory memory storage module 604. Memory storage module 604 can be referred to as historical activity removing module 604. In many embodiments, historical activity removing module 604 can store computing instructions configured to run on one or more processing modules and perform one or more acts of method 400 (FIG. 4) (e.g., activity 404 (FIG. 4)).

In many embodiments, system 600 can comprise non-transitory memory storage module 605. Memory storage module 605 can be referred to as product type intent predicting module 605. In many embodiments, product type intent predicting module 605 can store computing instructions configured to run on one or more processing modules and perform one or more acts of method 400 (FIG. 4) (e.g., activity 405 (FIG. 4)).

In many embodiments, system 600 can comprise non-transitory memory storage module 606. Memory storage module 606 can be referred to as predictive algorithm training module 606. In many embodiments, predictive algorithm training module 606 can store computing instructions configured to run on one or more processing modules and perform one or more acts of method 400 (FIG. 4) (e.g., activity 406 (FIG. 4)).

In many embodiments, system 600 can comprise non-transitory memory storage module 607. Memory storage module 607 can be referred to as classification algorithm applying module 607. In many embodiments, classification algorithm applying module 607 can store computing instructions configured to run on one or more processing modules and perform one or more acts of method 400 (FIG. 4) (e.g., activity 407 (FIG. 4)).

In many embodiments, system 600 can comprise non-transitory memory storage module 608. Memory storage module 608 can be referred to as product type intent post-processing module 608. In many embodiments, product type intent post-processing module 608 can store computing instructions configured to run on one or more processing modules and perform one or more acts of method 400 (FIG. 4) (e.g., activity 408 (FIG. 4)).

In many embodiments, system 600 can comprise non-transitory memory storage module 609. Memory storage module 609 can be referred to as product type intent re-ranking module 609. In many embodiments, product type intent re-ranking module 609 can store computing instructions configured to run on one or more processing modules and perform one or more acts of method 400 (FIG. 4) (e.g., activity 409 (FIG. 4)).

In many embodiments, system 600 can comprise non-transitory memory storage module 610. Memory storage module 610 can be referred to as GUI displaying module 610. In many embodiments, GUI displaying module 610 can store computing instructions configured to run on one or more processing modules and perform one or more acts of method 400 (FIG. 4) (e.g., activity 410 (FIG. 4)).

Although systems and methods for modifying a GUI have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. One or more of the procedures, processes, or activities of FIG. 4 may include one or more of the procedures, processes, or activities of another different one of FIG. 4. As another example, the components within system 300 (FIG. 3), and/or system 600 (FIG. 6) can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
a processor; and
a non-transitory computer-readable medium storing computing instructions that, when executed on the processor, cause the processor to perform:
receiving, from an electronic device of a user, in-session user activity on a graphical user interface (GUI) of a website displayed to the user via the electronic device;
selectively aggregating the in-session user activity by sorting the in-session user activity into one or more groups;
predicting one or more product type intents of the user based on the one or more groups and using one or more predictive algorithms;
post-processing the one or more product type intents to filter out one or more non-relevant product type intents from the one or more product type intents to create filtered product type intents; and
modifying the GUI to display the filtered product type intents to the user, wherein the one or more predictive algorithms are iteratively trained in real time as data is added to a training data set, wherein the data added to the training data set includes dynamic user interactions with the GUI, as modified, during a user session.

2. The system of claim 1, the computing instructions further cause the processor to perform receiving historical user activity associated with the user, the historical user activity corresponding to historical user activity on the website and historical brick-and-mortar activity at a store having the website.

3. The system of claim 2, wherein the selectively aggregating the in-session user activity by the sorting the in-session user activity into the one or more groups further comprises weighting the in-session user activity and weighting the historical user activity.

4. The system of claim 3, wherein the selectively aggregating the in-session user activity by the sorting the in-session user activity into the one or more groups further comprises altering at least a portion of the in-session user activity or the historical user activity based on at least one of: i) features corresponding to purchase patterns of the user, ii) price based features, iii) a number of items in a product type, iv) a number of item groups in a product type, v) a number of unique purchases and repeated purchases in a product type or vi) the in-session user activity, as weighted, and the historical user activity, as weighted.

5. The system of claim 1, wherein the predicting the one or more product type intents of the user based on the one or more groups using the one or more predictive algorithms further comprises:
converting the in-session user activity into vector format;
incrementing a count in an activity database for a product type intent for the user when no purchase information is present; and decreasing the count in the activity database when the product type intent for the user has recent purchase information present.

6. The system of claim 1, wherein the predicting the one or more product type intents of the user based on the one or more groups using the one or more predictive algorithms further comprises applying a multi-class classification algorithm to predict one or more probabilities that the user exhibits the one or more product type intents to perform one or more actions on the GUI.

7. The system of claim 1, wherein the predicting the one or more product type intents of the user based on the one or more groups using the one or more predictive algorithms further comprises training the one or more predictive algorithms by estimating internal parameters of a model configured to determine the one or more product type intents of the user while interacting with the GUI.

8. The system of claim 7, wherein the one or more predictive algorithms use an equation comprising:

$$P_{Purch\Box Pti} = \begin{cases} 0, & \text{if } X \text{ is null vector} \\ \dfrac{1}{\left(1 - e^{-W*X^T}\right)}, & \text{otherwise} \end{cases}$$

wherein P comprises a probability of the user having a product type intent, X comprises one or more user features, and W comprises one or more learnt weights of a model probability for a complementary action space.

9. The system of claim 1, wherein the post-processing the one or more product type intents further comprises filtering out the one or more non-relevant product type intents that are below a predetermined likelihood to be performed by the user more than once in a predetermined amount of time.

10. The system of claim 1, wherein the post-processing the one or more product type intents to filter out the one or more non-relevant product type intents further comprises re-ranking the filtered product type intents using a dot product of the filtered product type intents.

11. A method implemented via execution of computing instructions configured to run at a processor and configured to be stored at a non-transitory computer-readable medium, the method comprising:
  receiving, from an electronic device of a user, in-session user activity on a graphical user interface (GUI) of a website displayed to the user via the electronic device;
  selectively aggregating the in-session user activity by sorting the in-session user activity into one or more groups;
  predicting one or more product type intents of the user based on the one or more groups and using one or more predictive algorithms;
  post-processing the one or more product type intents to filter out one or more non-relevant product type intents from the one or more product type intents to create filtered product type intents; and
  modifying the GUI to display the filtered product type intents to the user, wherein the one or more predictive algorithms are iteratively trained in real time as data is added to a training data set, wherein the data added to the training data set includes dynamic user interactions with the GUI, as modified, during a user session.

12. The method of claim 11, the computing instructions further cause the processor to perform receiving historical user activity associated with the user, the historical user activity corresponding to historical user activity on the website and historical brick-and-mortar activity at a store having the website.

13. The method of claim 12, wherein the selectively aggregating the in-session user activity by the sorting the in-session user activity into the one or more groups further comprises weighting the in-session user activity and weighting the historical user activity.

14. The method of claim 13, wherein the selectively aggregating the in-session user activity by the sorting the in-session user activity into the one or more groups further comprises altering at least a portion of the in-session user activity or the historical user activity based on at least one of: i) features corresponding to purchase patterns of the user, ii) price based features, iii) a number of items in a product type, iv) a number of item groups in a product type, or v) a number of unique purchases and repeated purchases in a product type vi) the in-session user activity, as weighted, and the historical user activity, as weighted.

15. The method of claim 11, wherein the predicting the one or more product type intents of the user based on the one or more groups using the one or more predictive algorithms further comprises:
  converting the in-session user activity into vector format;
  incrementing a count in an activity database for a product type intent for the user when no purchase information is present; and
  decreasing the count in the activity database when the product type intent for the user has recent purchase information present.

16. The method of claim 11, wherein the predicting the one or more product type intents of the user based on the one or more groups using the one or more predictive algorithms further comprises applying a multi-class classification algorithm to predict one or more probabilities that the user exhibits the one or more product type intents to perform one or more actions on the GUI.

17. The method of claim 11, wherein the predicting the one or more product type intents of the user based on the one or more groups using the one or more predictive algorithms further comprises training the one or more predictive algorithms by estimating internal parameters of a model configured to determine the one or more product type intents of the user while interacting with the GUI.

18. The method of claim 17, wherein the one or more predictive algorithms use an equation comprising:

$$P_{Purch\Box Pti} = \begin{cases} 0, & \text{if } X \text{ is null vector} \\ \dfrac{1}{\left(1 - e^{-W*X^T}\right)}, & \text{otherwise} \end{cases}$$

wherein P comprises a probability of the user having a product type intent, X comprises one or more user features, and W comprises one or more learnt weights of a model probability for a complementary action space, and wherein the post-processing the one or more product type intents to filter out the one or more non-relevant product type intents further comprises re-ranking the filtered product type intents using a dot product of the filtered product type intents.

19. A non-transitory computer-readable medium storing instructions that, when executed by a processor, cause the processor to perform operations comprising:

receiving, from an electronic device of a user, in-session user activity on a graphical user interface (GUI) of a website displayed to the user via the electronic device;

selectively aggregating the in-session user activity by sorting the in-session user activity into one or more groups;

predicting one or more product type intents of the user based on the one or more groups and using one or more predictive algorithms;

post-processing the one or more product type intents to filter out one or more non-relevant product type intents from the one or more product type intents to create filtered product type intents; and modifying the GUI to display the filtered product type intents to the user, wherein the one or more predictive algorithms are iteratively trained in real time as data is added to a training data set, wherein the data added to the training data set includes dynamic user interactions with the GUI, as modified, during a user session.

20. The non-transitory computer-readable medium storing the instructions of claim 19, wherein the predicting the one or more product type intents of the user based on the one or more groups using the one or more predictive algorithms further comprises:

converting the in-session user activity into vector format;

incrementing a count in an activity database for a product type intent for the user when no purchase information is present; and decreasing the count in the activity database when the product type intent for the user has recent purchase information present.

* * * * *